(12) United States Patent
Opris

(10) Patent No.: US 7,986,923 B1
(45) Date of Patent: Jul. 26, 2011

(54) SIGNAL CHANNEL BALANCING

(76) Inventor: Ion E. Opris, San Jose, CA (US)

( * ) Notice: Subject to any disclaimer, the term of this patent is extended or adjusted under 35 U.S.C. 154(b) by 499 days.

(21) Appl. No.: 12/313,596

(22) Filed: Nov. 20, 2008

(51) Int. Cl.
*H04B 1/04* (2006.01)

(52) U.S. Cl. ........................................ 455/103; 455/104

(58) Field of Classification Search .......................... None
See application file for complete search history.

(56) References Cited

U.S. PATENT DOCUMENTS

| | | | | | |
|---|---|---|---|---|---|
| 5,485,100 | A | * | 1/1996 | Kogut | 324/610 |
| 6,147,553 | A | * | 11/2000 | Kolanek | 330/10 |

* cited by examiner

*Primary Examiner* — An Luu

(57) ABSTRACT

A system and method for signal channel balancing through accurate estimation of signal amplitude and phase parameters are described. The system includes multiple analog-to-digital (A/D) converter devices coupled to a digital signal processing (DSP) unit, each A/D converter device corresponding to a communication channel within the system. The system further includes multiple analog multiplexers, each analog multiplexer being coupled to a corresponding A/D converter device and having a number of inputs equal to the number of communication channels to be balanced within the system. The system further includes a timing generator circuit and selection logic coupled to the DSP unit, such that for each clock cycle, a single analog channel input is routed to each A/D converter device.

17 Claims, 5 Drawing Sheets

SIGNAL CHANNEL BALANCING

TECHNICAL FIELD

The invention relates generally to multi-channel and/or single side-band communication systems, and more particularly, to systems and methods to measure and calibrate signal amplitude, offset, and phase among different channels.

BACKGROUND

A single side-band (SSB) communication system requires accurate balancing of amplitude, offset, and phase between the in-phase (I) and quadrature (Q) channels for the best image rejection. A method widely used in the transmit channel is to use analog to digital (A/D) converters to accurately measure the amplitude and phase of the I and Q channels right before the single side-band mixer, and use that information in a digital signal processing (DSP) unit in a feedback configuration to adjust the gain, offset, and phase mismatch of the two channels, as illustrated in FIG. 1.

FIG. 1 is a schematic diagram of a conventional approach for I/Q channel balancing. The system 100 shown in FIG. 1 includes two analog-to-digital (A/D) converters 101, 102 coupled to a digital signal processing (DSP) unit 103. The A/D converters 101, 102 are able to sample the signal bandwidth of the I and Q channels 111, 112, respectively, but the information bandwidth extracted (signal amplitude, offset, and phase) in the DSP unit 103 is much lower than the signal bandwidth. Therefore, the A/D noise performance of the system 100 can be low to moderate due to averaging and bandwidth reduction in the DSP unit 103.

However, systematic mismatches between the I and Q A/D converters 101, 102, translate directly into mismatches of the I and Q amplitude, offset, and phase information, leading to reduced image frequency cancellation and local oscillator feedthrough. The A/D converters for such applications need very high matching performance, usually much higher than their noise performance.

One proposed system architecture designed to avoid the need for matched A/D converters is shown in FIG. 2. FIG. 2 is a schematic diagram of a conventional approach for I/Q channel balancing using a single A/D converter. In FIG. 2, a system 200 uses a single A/D converter 201 coupled to a DSP unit 203 and being clocked at twice the normal sampling rate. The system 200 multiplexes the I and Q channel signals 211 and 212 at its inputs. The perceived drawbacks of this proposed technique relate to the fact that the A/D converter 201 has to work at twice the previous clock rate, which may or may not be available in the system 200, and the fact that, due to time interleaving, the I and Q channel sampling does not occur at the same time, but there is a ½ clock time difference between the I and Q channel sampling. This time difference requires special processing in the DSP unit 203 and can have various unintended effects on the signal amplitude and phase estimation based on I and Q signal bandwidth compared to the A/D converter sampling rate.

It would be advantageous, therefore, to provide a method and system without the aforementioned drawbacks.

SUMMARY

A system and method for signal channel balancing through accurate estimation of signal amplitude and phase parameters are described. Synchronized multiplexer and demultiplexer modules are provided at the respective input and output of two A/D converter devices without requiring any change in a digital signal processing (DSP) unit or the rest of the communication system.

In one embodiment, the I and Q input signals are swapped every clock cycle. The data outputs from the I and Q A/D converters are also swapped synchronously before the data is fed to the DSP unit. In an alternate embodiment, the swapping of inputs and data is based on a pseudo-random sequence. In yet another alternate embodiment, an N-input analog multiplexer module is used in front of N A/D converters in an N-channel system.

These features of the present invention will be apparent from consideration of the following detailed description of the invention and the accompanying drawings.

DETAILED DESCRIPTION

Figure 3:
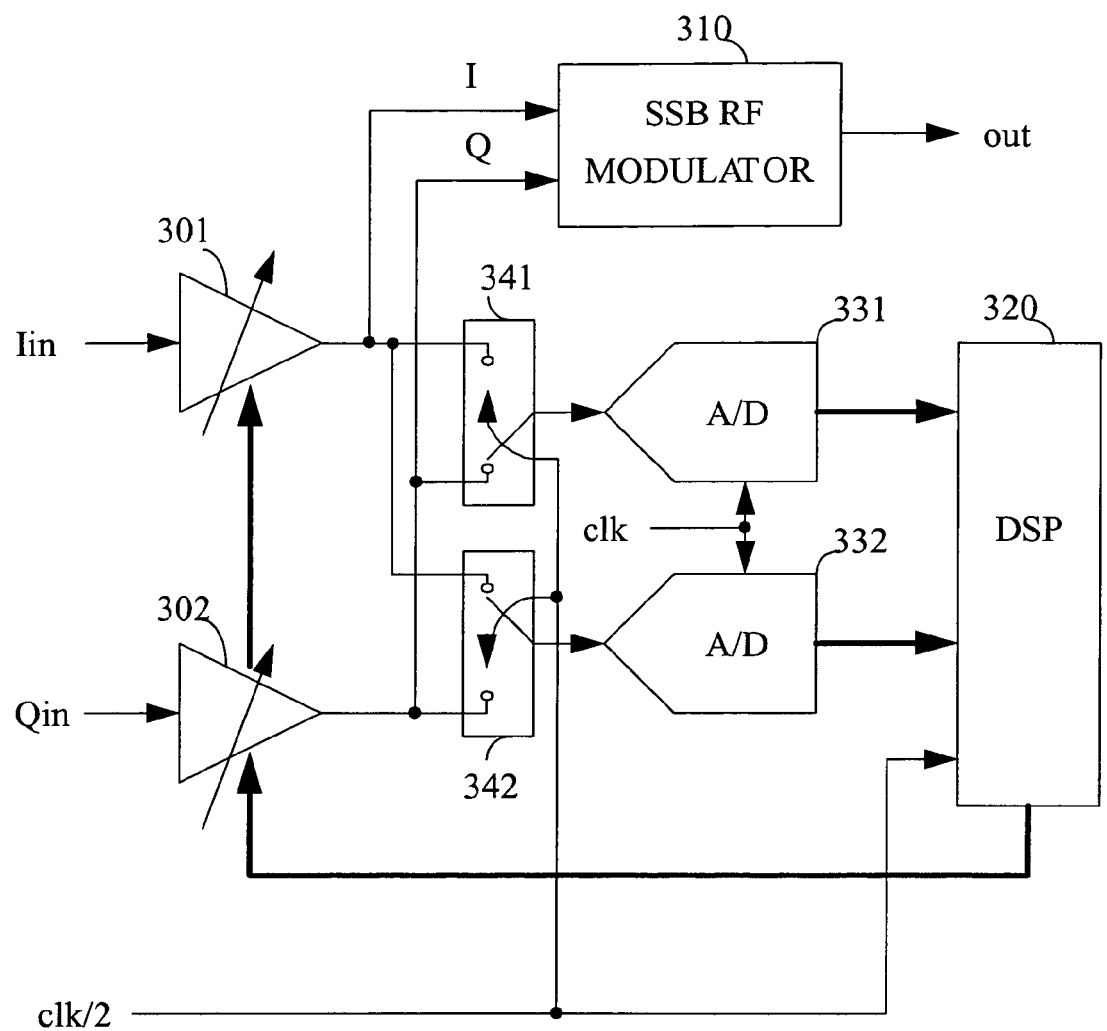
FIG. 3 is a schematic diagram of a method for signal channel balancing, according to one embodiment of the present invention.

FIG. 3 is a schematic diagram of a method for signal channel balancing, according to one embodiment of the present invention. As illustrated in FIG. 3, a balancing circuit 300 includes two gain amplifiers 301 and 302, whose gain, offset, and/or phase parameters are controlled by a DSP unit 320. An I signal output 311 of the amplifier 301 and a Q signal output of the amplifier 302 are used in a single side-band radio frequency (SSB RF) modulator 310 coupled to the gain amplifiers 301, 302.

In one embodiment, two analog multiplexers 341 and 342 are further coupled to the gain amplifiers 301 and 302, respectively, to select the corresponding I and Q analog signals to the inputs of two respective A/D converter devices 331 and 332 coupled to the DSP unit 320, and to swap those inputs between the two A/D converters 331, 332 every other clock cycle.

In one embodiment, a demultiplexer circuit at the input of the DSP unit 320 is synchronous with the analog multiplexers 341, 342, so as to route the digital output data of the A/D converters 331, 332 to the appropriate digital channel.

Figure 1:
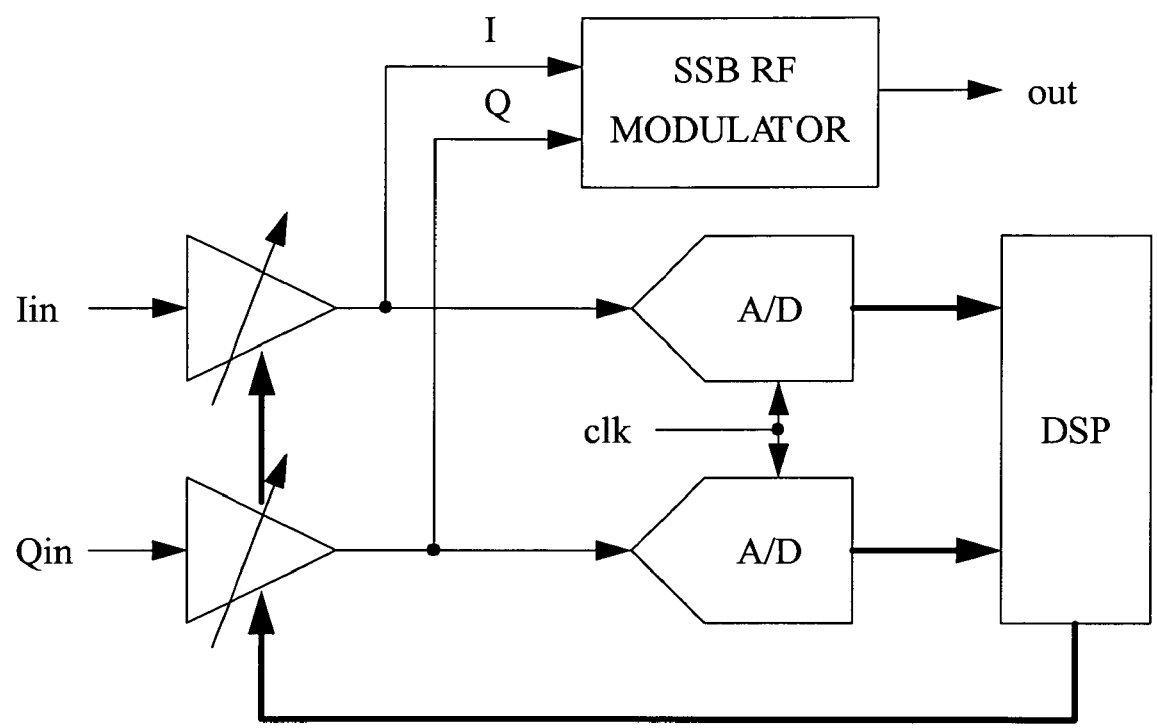
FIG. 1 is a schematic diagram of a conventional approach for I/Q channel balancing.
Figure 2:
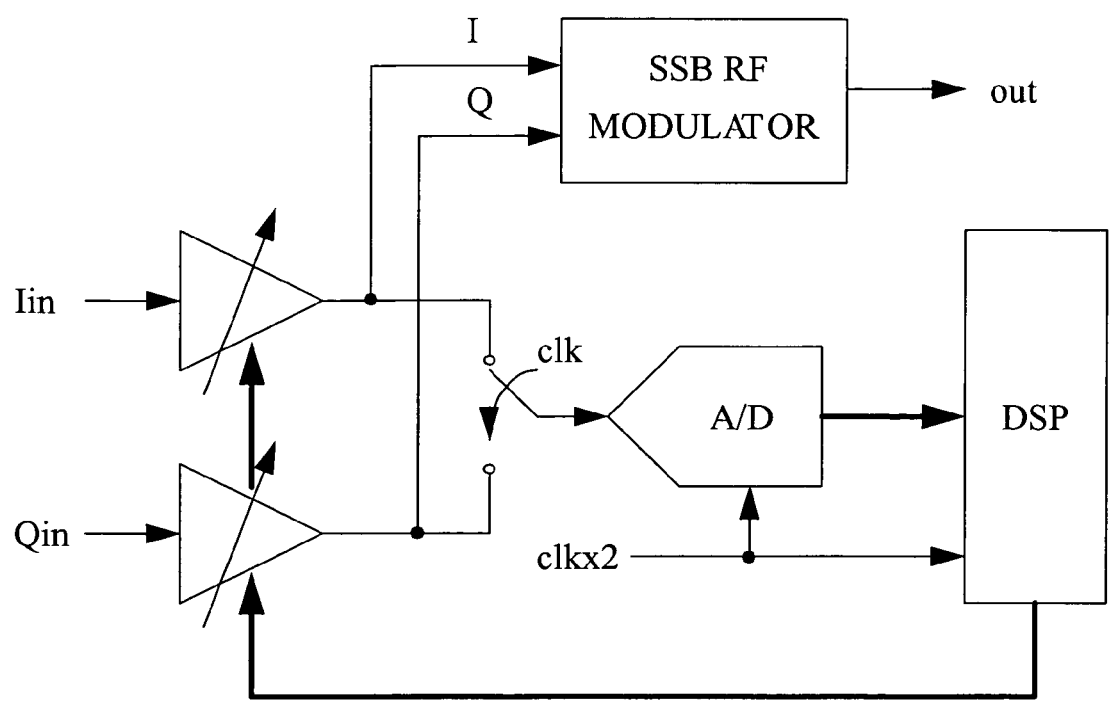
FIG. 2 is a schematic diagram of a conventional approach for I/Q channel balancing using a single A/D converter.

Compared to the conventional approach illustrated in FIG. 1, the circuit 300 described in detail above basically swaps the role of the two A/D converters 331, 332 every other sampling clock. The inherent A/D mismatches are modulated with ½ sample clock rate and pushed to higher frequencies, hence the mismatches are averaged out in the averaging and bandwidth reduction in the DSP unit 320.

Figure 4:
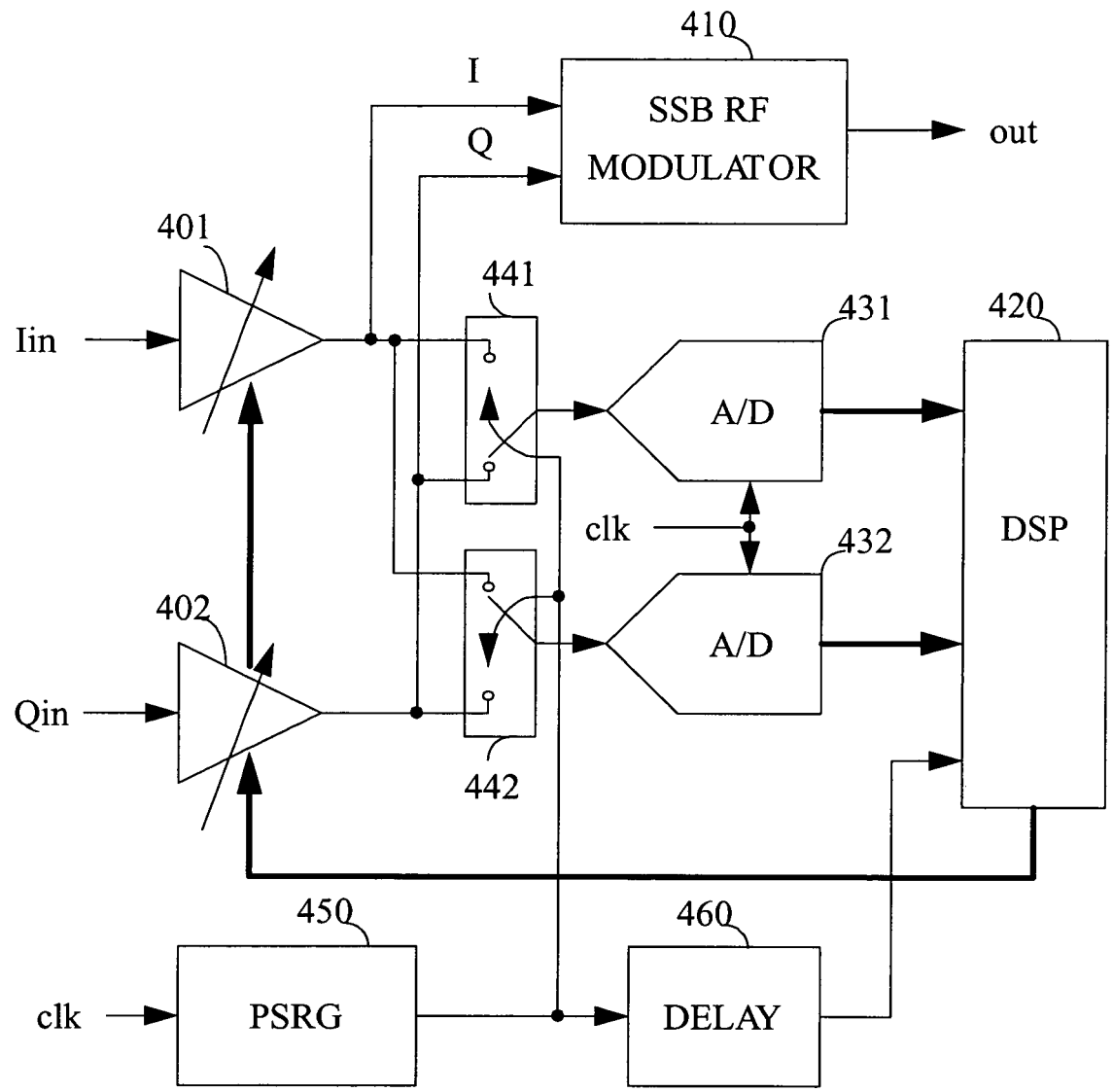
FIG. 4 is a schematic diagram of a method for signal channel balancing, according to an alternate embodiment of the present invention.

FIG. 4 is a schematic diagram of a method for signal channel balancing, according to an alternate embodiment of the present invention. The embodiment shown in FIG. 4 is configured for systems wherein significant signal energy is present at or close to the ½ sample clock rate. As shown in FIG. 4, a system 400 uses a pseudo random sequence generator (PRSG) 450 to generate a pseudo random sequence for swapping. Thus, the system 400 is configured to spread the mismatch energy in the entire digitized spectrum. In one embodiment, a delay block 460 is coupled to the PRSG 450 and is matched to the latency of the respective A/D converters 431, 432. The delay block 460 is used for proper synchronization of the digital data demultiplexer in the DSP unit 420 with the actual analog input channel sampling.

Figure 5:
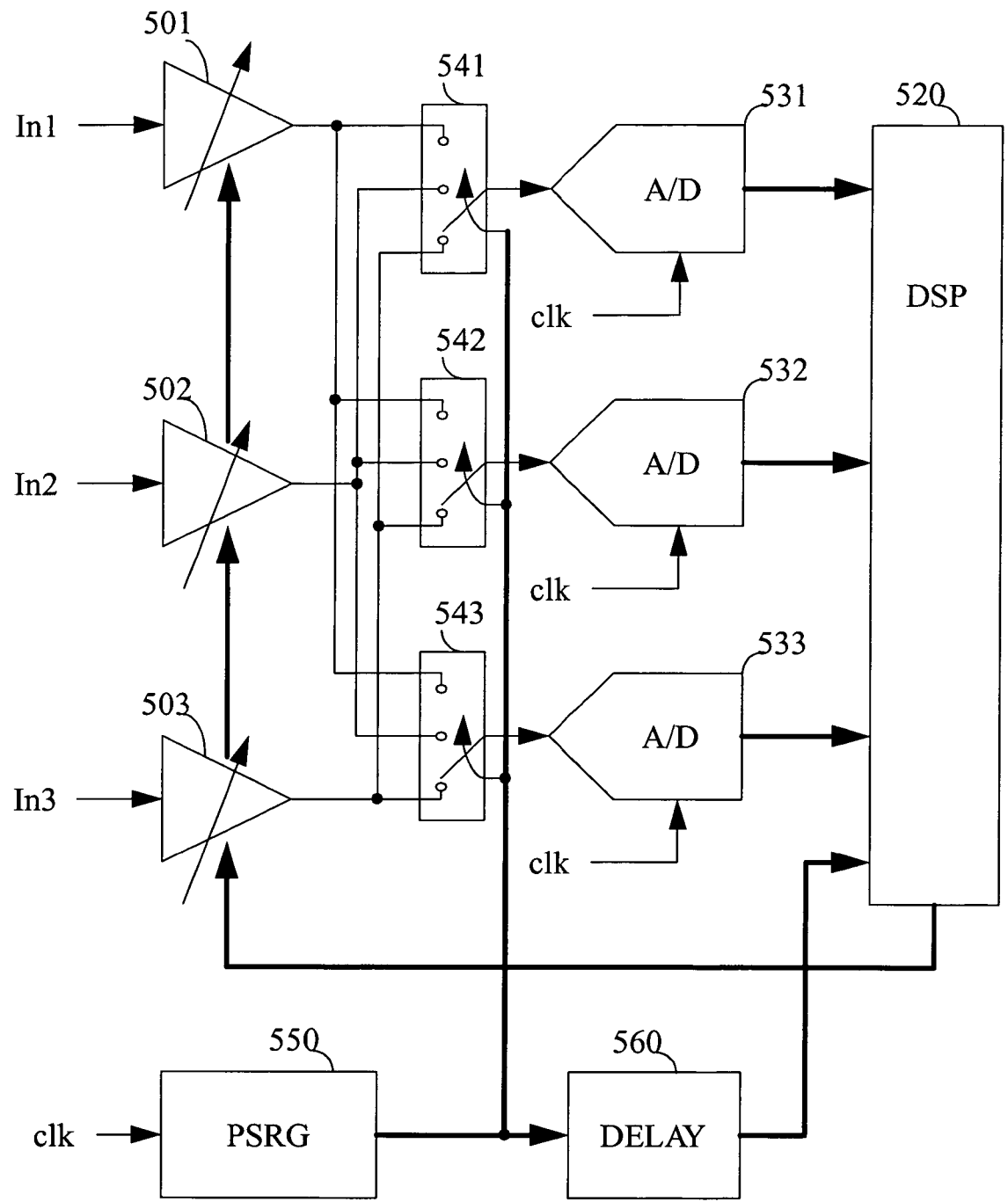
FIG. 5 is a schematic diagram of a method for signal channel balancing, according to yet another alternate embodiment of the present invention.

In one embodiment, the balancing methods described in detail above may be generalized to multi-channel systems as shown in FIG. 5. FIG. 5 is a schematic diagram of a method for signal channel balancing, according to yet another alternate embodiment of the present invention. In FIG. 5, a 3-input system is described herein, but it is to be understood that the described method may be applied to any number of channels. In one embodiment, each one of the A/D converters 531, 532, and 533, has a respective input analog multiplexer 551, 552, and 553, each multiplexer having three analog inputs connected to the output of three programmable amplifiers 501, 502, and 503. The selection logic in these analog multiplexers 551, 552, 553 is configured such that for any control word, one and only one analog channel is routed to an A/D input of a respective A/D converter 532, 532, 533.

In one embodiment, a pseudo-random sequence generator (PRSG) 550 generates digital words in such a way as to select each analog input to each of the A/D converter inputs about ⅓ of the time, on average. Furthermore, a delay block 560, matched to the A/D latency delay and coupled to the PRSG 550, is provided to synchronize the digital data demultiplexer in the DSP unit 520 with the appropriate channel data selection.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In the foregoing description, the invention has been described with reference to specific exemplary embodiments thereof. It will, however, be evident that various modifications and changes be made thereto without departing from the broader spirit and scope of the invention as set forth in the appended claims. The specification and drawings are, accordingly, to be regarded in an illustrative sense rather than a restrictive sense.

The invention claimed is:

1. A circuit for signal channel balancing in a multi-channel communication system, the circuit comprising:
   a plurality of analog-to-digital (A/D) converter devices coupled to a digital signal processing (DSP) unit, each A/D converter device corresponding to a communication channel within said system;
   a plurality of analog multiplexers, each analog multiplexer coupled to a corresponding A/D converter device of said plurality of A/D converter devices and having a number of inputs equal to the number of communication channels to be balanced within said system; and
   a timing generator circuit and selection logic coupled to said DSP unit, such that for each clock cycle, a single analog channel input is routed to said each A/D converter device.

2. The circuit of claim 1, wherein said timing generator circuit is a clock divider.

3. The circuit of claim 1, wherein said timing generator circuit is a pseudo-random sequence generator (PSRG).

4. The circuit of claim 3, wherein said PSRG generates a pseudo-random sequence for swapping said inputs among said each A/D converter device every other clock cycle.

5. The circuit of claim 1, further comprising a digital data demultiplexer at said input of said DSP unit synchronized with a delayed output of said timing generator circuit.

6. A method for signal channel balancing in a multi-channel communication system, the method comprising:
   coupling a plurality of analog-to-digital (A/D) converter devices to a digital signal processing (DSP) unit, each A/D converter device corresponding to a communication channel within said system;

coupling each analog multiplexer of a plurality of analog multiplexers to a corresponding A/D converter device of said plurality of A/D converter devices, said each analog multiplexer having a number of inputs equal to the number of communication channels to be balanced within said system; and coupling a timing generator circuit and selection logic to said DSP unit, such that for each clock cycle, a single analog channel input is routed to said each A/D converter device.

7. The method of claim 6, wherein said timing generator circuit is a clock divider.

8. The method of claim 6, wherein said timing generator circuit is a pseudo-random sequence generator (PSRG).

9. The method of claim 8, wherein said PSRG generates a pseudo-random sequence for swapping said inputs among said each A/D converter device every other clock cycle.

10. The method of claim 1, further comprising coupling a digital data demultiplexer at said input of said DSP unit, said digital data demultiplexer being synchronized with a delayed output of said timing generator circuit.

11. A method for signal channel balancing in a multi-channel communication system, the method comprising:

selecting a plurality of analog signals to respective inputs of a plurality of analog-to-digital (A/D) converter devices coupled to a digital signal processing (DSP) unit, each A/D converter device corresponding to a communication channel within said system;

swapping said inputs every other clock cycle provided by a timing generator circuit and selection logic coupled to said DSP unit, such that for each clock cycle, a single analog channel input is routed to said each A/D converter device.

12. The method of claim 11, wherein said swapping further comprises coupling each analog multiplexer of a plurality of analog multiplexers to a corresponding A/D converter device of said plurality of A/D converter devices, said each analog multiplexer having a number of inputs equal to the number of communication channels to be balanced within said system.

13. The method of claim 11, wherein said timing generator circuit is a clock divider.

14. The method of claim 11, wherein said timing generator circuit is a pseudo-random sequence generator (PSRG).

15. The method of claim 12, wherein said swapping further comprises generating a pseudo-random sequence for swapping said inputs among said each A/D converter device every other clock cycle.

16. An apparatus for signal channel balancing in a multi-channel communication system, the apparatus comprising:

means for selecting a plurality of analog signals to respective inputs of a plurality of analog-to-digital (A/D) converter devices coupled to a digital signal processing (DSP) unit, each A/D converter device corresponding to a communication channel within said system;

means for swapping said inputs every other clock cycle provided by a timing generator circuit and selection logic coupled to said DSP unit, such that for each clock cycle, a single analog channel input is routed to said each A/D converter device.

17. A computer readable medium comprising executable instructions, which, when executed in a processing system, cause said processing system to perform a method for signal channel balancing in a multi-channel communication system, the method comprising:

selecting a plurality of analog signals to respective inputs of a plurality of analog-to-digital (A/D) converter devices coupled to a digital signal processing (DSP) unit, each A/D converter device corresponding to a communication channel within said system;

swapping said inputs every other clock cycle provided by a timing generator circuit and selection logic coupled to said DSP unit, such that for each clock cycle, a single analog channel input is routed to said each A/D converter device.

\* \* \* \* \*